Oct. 1, 1968

S. P. MITOFF 3,404,039

ELECTRICAL DEVICE INCLUDING STABILIZED
ZIRCONIA SOLID ELECTROLYTE
Filed Nov. 18, 1964

Inventor:
Stephan P. Mitoff,
by Paul R. Nebb, II
His Attorney.

3,404,039
ELECTRICAL DEVICE INCLUDING STABILIZED ZIRCONIA SOLID ELECTROLYTE

Stephan P. Mitoff, Elnora, N.Y., assignor to General Electric Company, a corporation of New York
Filed Nov. 18, 1964, Ser. No. 412,158
4 Claims. (Cl. 136—86)

ABSTRACT OF THE DISCLOSURE

Solid oxygen-ion electrolyte material for high temperature fuel cells must be densified to minimize, and preferably obviate, the passage of gas therethrough. The addition of iron oxide to the oxygen-ion material to effect such densification at lower firing temperatures is disclosed, the exemplary description being the densification of stabilized zirconia with $Fe_3O_4$ (0.5 to 10.5 weight percent).

---

This invention relates to high temperature fuel cells and more particularly to high temperature fuel cell solid electrolytes.

Fuel cells, operable at high temperatures in the range of 1000° C. to 1200° C., are shown in U.S. Letters Patents 3,138,487 and 3,138,490 which are assigned to the same assignee as the present application. Each of these fuel cells employs a solid oxygen-ion electrolyte, solid electrodes, fuel and oxidant supplies for the respective electrodes, and electrical leads connected to the respective electrodes. Such fuel cells provide a low voltage direct current power source on a continuous basis. Such cells have application in various chemical process industries, such as the manufacture of aluminum and the electro-refining of copper. Furthermore, these cells can be employed to operate direct current motors.

In a solid oxygen-ion electrolyte of the above type, a problem is presented by gas permeability through the electrolyte which is not eliminated by the high firing temperature of the electrolyte during its manufacture. Thus, it would be desirable to minimize this gas permeability thereby increasing the operating efficiency of the cell. The present invention is directed to an improved high temperature fuel cell electrolyte which has an increased density thereby minimizing gas permeability while retaining its ionic conductivity.

It is an object of my invention to provide an improved solid oxygen-ion electrolyte.

It is another object of my invention to provide an improved solid oxygen-ion electrolyte which minimizes gas permeability therethrough.

It is a further object of my invention to provide an improved solid oxygen-ion electrolyte with an addition of iron oxide thereto.

In carrying out my invention in one form, a solid electrolyte consists of 0.5 to 10.5 weight percent of iron oxide, and the balance being a solid oxygen-ion material.

These and various other objects, features, and advantages of the invention will be better understood from the following description taken in connection with the accompanying drawing in which.

Figure 1:
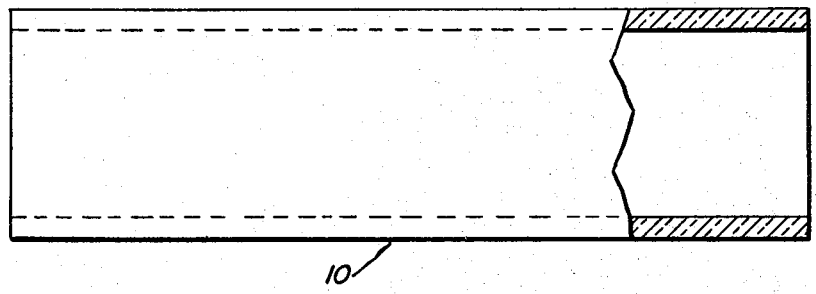
FIGURE 1 is a sectional view of a solid oxygen-ion electrolyte embodying my invention.

In FIGURE 1 of the drawing, a solid oxygen-ion electrolyte is shown at 10 in the form of a hollow tubular member. Electrolyte 10 consists of 0.5 to 10.5 weight percent iron oxide, and the balance being solid stabilized zirconia, a solid oxygen-ion material.

Figure 2:
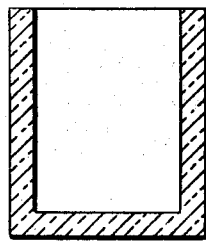
FIGURE 2 is a sectional view of a modified electrolyte.

In FIGURE 2 of the drawing, there is shown a modified solid oxygen-ion electrolyte comprising a container 11 consisting of the same material as electrolyte 10 shown in FIGURE 1 of the drawing.

Figure 3:
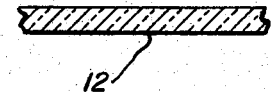
FIGURE 3 is a sectional view of another modified electrolyte.

In FIGURE 3 of the drawing, there is shown another modified solid oxygen-ion electrolyte comprising a plate 12 of the same material as electrolyte 10 shown in FIGURE 1 of the drawing.

Figure 4:
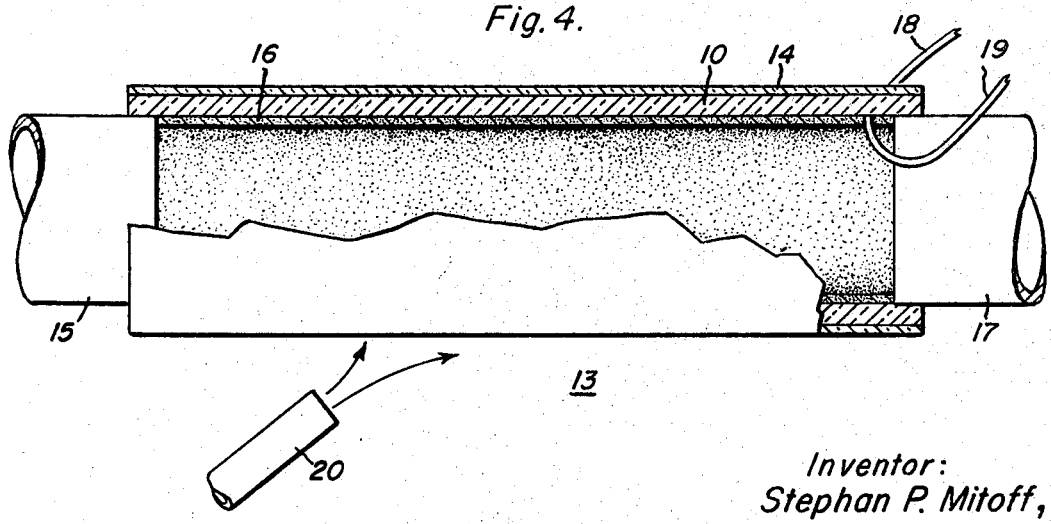
FIGURE 4 is a sectional view of a high temperature fuel cell embodying the solid oxygen-ion electrolyte of my invention.

In FIGURE 4 of the drawing, there is shown a high temperature fuel cell 13 embodying electrolyte 10 of FIGURE 1 in the form of a hollow tubular member consisting of 0.5 to 10.5 weight percent iron oxide, and the balance being solid stabilized zirconia. A porous layer 14 of lithiated nickel oxide adheres to the exterior surface of electrolyte 10 and provides the cathode for cell 13. Such a cathode is applied as described in copending patent application Ser. No. 363,549, filed Apr. 29, 1964, now abandoned. The anode for the fuel cell and the fuel is derived from carbonaceous material which is supplied to the interior surface of electrolyte 10. For example, an inlet line 15 provides a hydrocarbon gas, such as methane or propane to fuel cell 13 wherein the gas is thermally decomposed to carbonaceous material which is supplied to the interior surface of electrolyte 10 as at 16 to provide an anode. An outlet line 17 removes the carbon monoxide which forms during the operation of fuel cell 13. Thus, the carbonaceous material provides both carbonaceous fuel and anode 16 for cell 13.

Electrodes 14 and 16 are reversible with porous layer 14 of lithiated nickel oxide on the interior surface of electrolyte or member 10 and carbonaceous anode 16 in direct contact with the exterior surface of member 10. A lead 18 of platinum is attached to porous layer 14 of lithiated nickel oxide which is the cathode while a lead 19 of nickel contacts anode 16 by being positioned adjacent tubular member 10 which is the electrolyte. The free ends of the leads are connected to apparatus, such as an electric motor (not shown), being operated by the cell. Means are provided for supplying a gaseous oxidant containing molecular oxygen to porous layer 14 which oxidant includes, for example, air or oxygen. Thus, a tube 20 is shown connected to an oxidant supply (not shown) to supply oxidant to porous layer 14.

I discovered unexpectedly that the addition of 0.5 to 10.5 weight percent of iron oxide to a solid oxygen-ion material produced a very satisfactory electrolyte for a high temperature fuel cell operable in the range of 1000° C. to 1200° C. I found that such a body minimized gas permeability therethrough and provided an essentially ionic conductor. I found also that the improved solid oxygen-ion electrolyte could be used in the form of a hollow tubular member, a flat plate, or a container. Within the range of 0.5 to 10.5 weight percent addition of iron oxide, I prefer a range of 2 to 7 weight percent. I found that above 10.5 weight percent of iron oxide addition, a second phase was introduced which led to the subsequent deterioration of the body in an operating fuel cell. Optical examination disclosed such second phase. I include within the definition of iron oxide, $Fe_3O_4$, FeO and $Fe_2O_3$.

I found that the preferred oxygen-ion material to which the iron oxide addition is made is solid stabilized zirconia. However, other solid oxygen-ion material such as solid doped thoria is satisfactory for incorporating the addition of iron oxide thereto.

Solid stabilized zirconia, which is a solid oxygen-ion electrolyte material, is a compound with a cubic crystal structure consisting of zirconia to which is added calcium oxide, yttrium oxide, or a mixture of rare earth oxides. For example, the initial preferred solid zirconia material is stabilized with 11 molecular percent calcium oxide. Other initial stabilized zirconia, which may also be employed in the solid stabilized zirconia electrolyte, are discussed in "Oxide Ceramics" by Ryshkewitch, Academic Press, 1960, particularly on pages 354, 364 and 376 thereof.

Solid doped thoria is also a solid oxygen-ion electrolyte material which consists of thoria to which is added calcium oxide, yttrium oxide, or a mixture of rare earth oxides. For example, an initial solid doped thoria material consists of thoria which is doped with the addition of four molecular percent calcium oxide to increase its conductivity.

Lithiated nickel oxide is an electronic semiconductor which is a very satisfactory cathode material in a porous layer adhering to one surface of the solid oxygen-ion body functioning as the electrolyte of the cell. Other cathode materials such as silver and doped tantalum pentoxide are also suitable. Anode materials other than a carbonaceous material are suitable. For example, anodes of iron saturated with carbon or cobalt-tin saturated with carbon are satisfactory. Fuels of hydrogen or carbon monoxide are also employable in the fuel cell.

A preferred method of preparing the solid oxygen-ion body of my invention is to employ, for example, zirconia powder which has been stabilized by the addition of 13.75 weight percent of yttria. Such powder is available on the commercial market. One-half to ten and one-half percent of iron oxide powder, such as $Fe_3O_4$, is added to the stabilized zirconia powder which powders are then mixed and ground together. This mixture is then calcined at 1300° C. which results in a partially sintered product. This partially sintered product is reground to provide a powder which is pressed into a particular configuration such as a hollow tubular member, a container, or a plate. When two to seven weight percent of iron oxide is employed, the pressed configuration is then fired in air in a temperature range from 1450° C. to 1550° C. to provide a sintered body which has a single phase. When less than two weight percent of iron oxide is added higher firing temperatures are recommended to provide a dense body. This firing results in a high density body which minimizes gas permeability therethrough. A stabilized zirconia powder without such an iron addition requires an air firing at 1900° C.

The solid oxygen-ion body of my invention is then provided with a porous layer of lithiated nickel oxide on the exterior surface thereof to provide a cathode for the fuel cell. Such a lithiated nickel oxide cathode is initially painted from a slurry onto the exterior surface of my body in the form of a hollow tubular member. The painted body is subsequently dried and air fired to form the adherent lithiated nickel oxide cathode.

In FIGURE 4 of the drawing the hollow tubular electrolyte 10 prepared as described above and provided with a lithiated nickel oxide cathode 14 on its exterior surface is combined with other elements to form a fuel cell 13. An inlet line 15 is provided to communicate with the chamber formed by the solid oxygen-ion electrolyte and supplies a hydrocarbon gas, such as methane or propane to the cell. This hydrocarbon gas is thermally decomposed to carbonaceous material which is supplied to the interior surface of electrolyte 10 as at 16 to provide an anode for the fuel cell. An outlet line 17 is provided at the opposite end of electrolyte 10 and removes the carbon monoxide which forms during operation of the cell. Thus, the carbonaceous material provides both the carbonaceous fuel and the anode for the cell. A lead 18 of platinum is attached to the lithiated nickel oxide cathode 14 while a lead 19 of nickel contacts anode 16 by being positioned adjacent electrolyte 10. The free ends of the leads are connected to apparatus (not shown) being operated by the cell. Means are provided for supplying a gaseous oxidant containing molecular oxygen in the form of air or oxygen to lithiated nickel oxide cathode 14. For example, a tube 20 connected to an oxidant supply (not shown) supplies oxidant to cathode 14.

In the operation of fuel cell 13 shown in FIGURE 4, heat, such as waste heat, is supplied from a source (not shown) to raise the temperature of electrolyte 10, cathode 14, and anode 16, which anode is provided from a hydrocarbon gas or from a carbon vapor through inlet line 15 to a temperature in the range of 1000° C. to 1200° C. The porous lithiated nickel oxide cathode is then saturated with oxygen which is supplied through tube 20 to the cathode. The reaction at the cathode-electrolyte interface is as follows:

(1)   $O + 2e \rightarrow O^=$

The oxygen-ion moves through electrolyte 10 to combine with carbon in accordance with the following reaction at the anode-electrolyte interface:

(2)   $C + O^= \rightarrow CO + 2e$

The electrons, which are given up at anode 16 are conducted through lead 19 to apparatus (not shown) being operated while the oxygen at cathode 14 combines with the returning electrons. The carbon monoxide which is generated at anode 16 is released to the atmosphere, used to provide further heat for the cell, or fed to a fuel cell employing carbon monoxide as a fuel. Such release is through outlet line 20.

As it was discussed above other cathodes, anodes, and fuel supplies may be employed with the solid oxygen-ion body of the present invention to produce high temperature fuel cells. Other fuels may also be employed to operate such high temperature fuel cells.

Solid oxygen-ion electrolytes were made in accordance with the present invention. Each of these electrolytes was made from zirconia powder which was stabilized with 13.75 weight percent of yttria. These electrolytes consisted additionally of 1, 2, 5 and 10 weight percent of iron oxide, $Fe_3O_4$. The stabilized zirconia powder and the iron oxide powders in each of the above weight percentages were mixed and ground together. Subsequently, each of these powder mixtures was calcined at 1300° C. Subsequently, each of these partially sintered products were reground and formed into 4 separate flat plates of material. Each of the flat plates were fired in air at a temperature of 1550° C. for 12 hours.

These flat plates were then tested to determine their fluctuation of ionic conductivity at one atmosphere of pressure by employing an oxygen partial pressure differential. Oxygen was supplied to one side of each flat plate while air was supplied to the opposite side of the flat plate to provide a difference in partial pressure of oxygen. An electrical lead was attached to each side of the plate and to a potentiometer. Each of these plates exhibited a potential difference from one surface to the other surface thereby showing that each of these plates was useful as an ionic conductor.

While other modifications and variations thereof which may be employed within the scope of the present invention have not been described, the invention is intended to include such as may be embraced within the following claims.

What I claim as new and desire to secure by Letters Patent of the United States is:

1. In an electrical device for operation at temperatures in excess of about 1000° C., said device comprising a solid anode layer and a solid cathode layer separated by and in direct contact with a layer of sintered solid stabilized zirconia electrolyte, the improvement wherein a sintering aid is added to zirconia to form a single phase sintered layer of solid electrolyte of increased density, (1) said added sintering aid being 0.5 to 10.5 weight percent of iron oxide whereby the penetration of gas through said sintered layer of solid electrolyte is reduced.

2. The improvement substantially as recited in claim 1 wherein the iron oxide is $Fe_3O_4$.

3. In a fuel cell for operation at temperatures in excess of 1000° C., said fuel cell comprising a solid anode layer and a solid cathode layer separated by and in direct contact with a layer of sintered solid stabilized zirconia electrolyte, the improvement wherein a sintering aid is added to zirconia to form a single phase sintered layer of solid electrolyte of increased density, (1) said added sintering aid being 0.5 to 10.5 weight percent of iron oxide whereby the penetration of gas through said sintered layer of solid electrolyte is reduced.

4. The improvement substantially as recited in claim 3 wherein the iron oxide is $Fe_3O_4$.

References Cited
UNITED STATES PATENTS

| | | | |
|---|---|---|---|
| 1,491,224 | 4/1924 | Cooper | 106—57 |
| 3,192,070 | 6/1965 | Tragert et al. | 136—86 |
| 3,281,273 | 10/1966 | Oser | 136—86 |
| 2,914,596 | 11/1959 | Gorin et al. | 136—86 |
| 2,535,526 | 12/1950 | Ballard et al. | 106—57 |

ALLEN B. CURTIS, *Primary Examiner.*